United States Patent Office 2,705,696
Patented Apr. 5, 1955

2,705,696

PRODUCTION OF ANTIGENS

Don M. Wolfe, Pearl River, and George R. Sharpless, Orangeburg, N. Y., assignors to American Cyanamid Company, New York, N. Y., a corporation of Maine No Drawing. Application March 30, 1951, Serial No. 218,538

8 Claims. (Cl. 167—78)

This invention relates to antigens, more particularly to the preparation of biological products such as vaccines, toxoids, diagnostic antigens and other biological substances containing antigens.

During the preparation of various viral, rickettsial and bacterial vaccines, toxoids and diagnostic antigens, it becomes necessary, or desirable, in most instances to treat the preparation to destroy all viable organisms that might be present including the parent virus, rickettsiae or bacteria and contaminating organisms which may be present without destroying the antigenicity of the product. In the past many different physical and chemical methods have been used for this purpose. These, however, suffer certain disadvantages. Some methods of destroying viable organisms tend to destroy the antigenicity of the product, either at the time of the sterilization or on subsequent storage of the product. Some agents are toxic and can be used only in special instances or in relatively small amounts which may be ineffective or unreliable. Often it is desired that the antigen be relatively pure and free of other agents and some of the sterilizing agents of the prior art cannot be removed from the antigen containing product.

The application or induction of heat will destroy most viable organisms but if the product is contaminated with spore forming or other resistant organisms the heat required to render the product sterile will most often also destroy the antigen.

Many biological products containing antigens have been treated with ultra-violet radiation to destroy viable organisms but such processes can be used successfully only when the solution treated is exposed in an absolutely uniformly thin layer which is difficult, if not impossible, to obtain. Various factors interfere with the irradiation and the results obtained are often quite variable. Also, the radiation may adversely affect the antigen, particularly in the outermost part of the exposed layer.

Many biological products are sterilized by filtration, but a filtration media which will remove contaminating micro-organism, either by retention or absorption, may also remove part or all of the necessary components of the product. In addition such procedures are not safe for use with many of the more virulent viruses.

Chemical agents for the sterilization of biologicals are commonly used with much success but with attendant disadvantages. Formaldehyde, for example, is highly effective against many types of viruses, rickettsiae and bacteria but has the advantages that when once it has been added it is difficult to remove and during the storage of these products the formalin continues to act on protein matter in the product thus altering, reducing or destroying the antigenic component of the product. In addition, amounts of formalin as low as 0.05% in the vaccine produce a distinct stinging reaction when injected and thus make the product objectionable.

Phenols have been used in the preparation of various types of vaccines but as the denaturing action of phenol is very drastic, such reagents must be added very slowly and carefully. The phenol is very difficult to remove after it has once been added to the product and its continued activity may also alter, reduce or destroy the antigen.

Salts of heavy metals such as the mercurials are toxic when administered in large quantities and their maximum concentration is limited. These compounds also combine with protein and are less effective in products having a high protein content. Furthermore, they are primarily bacteriostatic rather than bactericidal in nature and they are quite specific in their action so that they are ineffective on many of a wide variety of micro-organisms.

Although the alkylene oxides are known to have a powerful bacteriocidal action we have discovered that the alkylene oxides, particularly ethylene oxide can be used to inactivate or render non-infectious viruses, rickettsiae and bacteria in aqueous suspensions without harming the antigens associated therewith and without reducing their antigenicity. This is considered surprising in view of the known activity of these compounds on protein matter. The alkylene oxides of the present invention may be used in the manner described hereinafter whenever it is necessary to render a biological product free from viable micro-organisms without changing the immunogenic or antigenic properties of the antigen which may be contained in the vaccine, toxoid or diagnostic antigen treated therewith. Although ethylene oxide raises the pH of the protein solutions to a slight degree the hydrogen ion concentrations may be adjusted to the desired level by appropriate methods and the refining, concentrating or other processing of the final product may proceed without interference from the sterilizing agent. It is a further advantage of the process that if at any time the alkylene oxide is found to be undesirable it may be removed and then added again at a later step in the process if so desired. Other advantages are that the alkylene oxide does not interfere with other chemical agents that may be added to the product during the processing thereof and may be used in conjunction with other bacteriostatic or bacteriocidal agents which may be added prior to, simultaneously with, or subsequent to the addition of the alkylene oxide.

The alkylene oxides which may be used in accordance with teachings of the present invention are known compounds and may generally be described as being 1,2-epoxides. Ethylene oxide is a preferred 1,2-epoxide of the present invention but propylene oxide and substituted alkylene oxides such as epichlorohydrin and epibromohydrin may also be used. Some hazards attend the use of these materials and review of the literature pertaining thereto is advisable before using them in practicing the invention.

We have found that the alkylene oxides may be added to the vaccine, toxin, roxoid or diagnostic antigen at any desired stage of manufacture without harm to the antigenic components thereof. The oxides may be added immediately after harvesting the infected tissue or at a later stage of the processing. In the case of the more virulent products it is usually desirable to treat with the alkylene oxide as soon as feasible. Where the harvested product is of large volume and a concentration thereof takes place during its manufacture it may be advantageous for economical reasons to carry out part of the concentration process before adding the alkylene oxide. In most cases it will be desirable to remove the alkylene oxide before bottling the product for final distribution and it may be desirable at that time to add a bacteriostatic agent to reduce the danger of subsequent contamination. A wide variety of different types and kinds of bacteriostatic agents are known and available for this purpose and need not be described herein.

We also found that ethylene oxide is applicable to the treatment of a large number of different types and kinds of products containing antigens. It may be used in conjunction with viral and rickettsial infected tissue from eggs including chick embryo, the yolk sac membrane, chorio-allantoic fluid, chlorio-allantoic membrane and the like. Also animal tissue such as heart, liver, spleen, brain, blood and the like. Although these products contain high proportions of protein matter we have found that ethylene oxide may be safely used to destroy the most virulent types of viruses that may be popagated in these various media. Ethylene oxide may also be used to treat various bacteriological broths and culture which may contain antigens which are to be recovered.

The ethylene oxide is generally added to the infected tissue at a low temperature in view of its low boiling point. Both the ethylene oxide and the tissue should be chilled to approximately the same temperature usually of the order +2° to +8° C. but obviously the temperature may be lower or higher if suitable precautions are taken particularly above 10° C. It is preferred that the ethylene oxide be added slowly with rapid mixing to obtain complete and uniform contact with the infected tissue.

The time necessary for inactivation of the infectious agent depends upon several factors including the particular virus, rickettsiae and bacteria, the concentration of ethylene oxide, concentration of tissue and temperature. At +4° C. using 40% chick embyro tissue infected with eastern equine encephalomyelitis virus, 1% of ethylene oxide completely inactivated the virus in 8 days. At 37° C. the 40% chick embyro tissue suspension was completely inactivated by 1% ethylene oxide in 5 hours. In general, satisfactory concentrations of ethylene oxide range from 0.5% by weight to 5% weight. The time ranges from 4 hours in the case of the higher concentrations and higher temperatures and the more resistant viruses. Obviously, if time is an important factor in the processing, the inactivation will be allowed to take place at higher concentrations and at higher temperatures, as in an incubator. In general, since ethylene oxide is known to have activity against protein matter, it should be removed from the antigen as soon as practical after the infectivity of the product has been destroyed. This may be easily determined by those in the art by the aid of relatively simple tests which can be conducted for each product.

One of the most important advantages of the process of the present invention is that the alkylene oxide may be easily and completely removed at will by allowing it to evaporate from the treated product in an open container. The removal is facilitated by applying vacuum to the material. Inasmuch as many of these products are frozen and dried it is found that the excess ethylene oxide is removed during this stage of the process. Alternatively the excess alkylene oxide may be removed by blowing an inert gas such as nitrogen through the liquid product. Oxygen is generally avoided because of the known reactivity of this gas on biological matter. If desired, ethylene oxide may be added again at a later stage if there is a possibility that the product may have become contaminated with undesirable organisms during the subsequent processing steps.

An additional unexpected advantage of the process is that when treating some products, for example, coxsackie antigen, ethylene oxide appears to act upon non-antigenic components of the preparation in such manner that these are made easier to remove in subsequent purification steps. This action is quite different from that of most other inactivating agents which generally make further processing more difficult.

Ethylene oxide is suitable for the treatment of any antigen product of viral, rickettsial or bacterial origin including vaccines, such as: catarrhalis vaccine, cholera vaccine, encephalitis vaccine, influenza virus vaccine, mumps vaccine, pertussis vaccine, rabies vaccine, smallpox vaccine, typhoid-paratyphoid vaccine, typhus vaccine (epidemic), canine distemper vaccine, clostridium chauvei-septicum vaccine, eastern equine encephalomyelitis, western equine encephalomyelitis, feline distemper, hemorrhagic septicemia, vaccine, Rocky Mountain spotted fever and Q fever vaccines. Polyvalent vaccines may also be treated. Diagnostic antigens which may also be treated by ethylene oxide in accordance with the present invention include: brucella abortus antigen, gonococcus antigen, coxsackie antigen, paratyphoid antigen, pasteurella tularensis antigen, proteus OX19 antigen, typhoid H antigen, Colorado tick fever antigen, eastern equine antigen, western equine encephalomyelitis antigen, influenza virus antigen, Japanese B antigen, lymphocytic-choriomeningitis antigen, mumps antigen, psittacosis antigen, Q fever antigen, rabies antigen, rickettsialpox antigen. The process is applicable also to vertinary bacterins, which are killed bacteria. Various toxoids may also be prepared in accordance with the present invention, and among these may be mentioned diphtheria toxoid, staphylococcus toxoid and tetanus toxoid.

The use of ethylene oxide in accordance with the teachings of the present invention will now be illustrated by the following examples. It will be understood that these are intended to be representative of different types and kinds of products that may be processed and are not to be construed as limiting the invention thereto. Other alkylene oxides such as propylene oxide and other substituted 1,2-epoxides may also be used in like manner.

EXAMPLE 1

Lymphocytic chorio-meningitis sero-diagnostic antigen

Guinea pigs are infected by an intraperitoneal injection of lymphocytic chorio-meningitis virus. After a maximum temperature rise in the infected animal, actually about 7 days, the animal is sacrificed and the lungs removed. The lung tissue is homogenized in water at a concentration of about 25% by weight, cooled to 6–8° C. and 1% by volume of ethylene oxide is added thereto. The mixture is allowed to stand at room temperature over night, 18 to 20 hours. The product is then shell frozen and dried under vacuum. At this point the highly infectious virus has been destroyed or completely inactivated and the material is safe for handling. The ethylene oxide has, of course, been removed during the drying operation.

To complete the preparation of the diagnostic antigen the dried tissue is treated with 1½ volumes (based on the original volume of the homogenized suspension) of benzene in order to extract lipids. The extraction is repeated 2 or 3 times as may be necessary. The residual benzene is then removed by centrifugation and vacuum dried. The product is then rehydrated in saline to the original volume and tissue is removed by centrifugation. The supernatant fluid is the desired diagnostic antigen.

EXAMPLE 2

Eastern equine encephalomyelitis

The vaccine or serodiagnostic antigen is prepared from the tissues of infected chick embryos. Fertile eggs after having been incubated (38° C.) for eleven days are infected by inoculating the yolk sac with 0.1 ml. of a 0.1% physiological saline suspension of EEE (eastern equine encephalomyelitis) infected chick embryo. The eggs are then incubated for 18 to 20 hours at 36 to 37° C., at which time the embryos are removed and weighed. The embryos with sufficient physiological saline to make a 40% suspension by weight are ground in a colloid mill or Waring blendor. To the 40% suspension is added sufficient ethylene oxide to make a 1.0% solution by weight and the well mixed mixture is allowed to stand at room temperature (23° C.) for 20 to 24 hours at which time it is non-infective. For use as a vaccine this suspension is then put into vials, frozen and dried under vacuum from the frozen state. For use as a sero-diagnostic antigen it is frozen, dried, the dry material extracted with benzene and resuspended in water.

EXAMPLE 3

Influenza vaccine

The vaccine is prepared from the fluid of the chorio-allantoic cavity of infected embryos.

Fertile eggs that have been incubated at 38° C. for eleven days are infected in the chorio-allantoic cavity by injecting 0.1 ml. of a 10–5 (1:100,000) dilution in physiological saline of a standardized allantoic fluid infected with a single strain of influenza virus. After an additional 48 hours of incubation at 35° C. the eggs are placed in the chill room (+4° C.) over night. This chilling kills the embryo and congeals the blood so that the slightly cloudy allantoic fluid can be harvested free of red blood cells. Ethylene oxide can be added to this allantoic fluid but a more economical procedure is to add 0.1% formalin as a bacteriostatic agent. This fluid contains the virus which is obtained as a sediment by passing the fluid through a Sharpless super centrifuge. This sediment is suspended in phosphate buffer M/10 pH 7.0 so that the final volume is 1/20 the original allantoic fluid. To this concentrate ethylene oxide (1.0%) can be added in order to sterilize the suspension. After standing at room temperature for 1 to 3 days the ethylene oxide is removed by subjecting the suspension to reduced pressure (100 to 500 microns pressure) at room temperature for 5 to 8 hours.

The suspension is tested for sterility, identity, potency and residual ethylene oxide. After satisfactory completion of these tests several batches of monovalent strains of influenza virus concentrate are pooled and diluted to a desired volume and antigenic titer. Bacteriostatic agents such as phenyl mercuric borate and formalin are added and after thorough mixing the samples are removed for sterility, identity, potency, safety and stability tests. After satisfactory completion of these tests the material may be filled and distributed.

EXAMPLE 4

Mumps vaccine

This vaccine is prepared and treated in the same manner as the influenza vaccine of the preceding example.

EXAMPLE 5

Coxsackie sero-diagnositc antigen

Suckling mice (less than 5 days of age) are infected by injecting 0.05 ml. subcutaneously of a 10% suspension in physiological saline of a tissue suspension of infected mice. In two or three days when the mice are paralyzed the eviscerated carcasses are made to a 20% suspension by weight in sterile distilled water. This suspension is stored at +6 to +8° C. for 48 hours. Ethylene oxide is added to make a 1% solution by weight. The mixture is allowed to stand at room temperature for 18 to 20 hours. The mixture is then frozen and dried under vacuum from the frozen state. The dried material is extracted with benzene and resuspended in water. A purified concentrate is prepared by alcohol precipitation and elution of the active diagnostic material from the precipitate in $1/10$ to $1/50$ of the original volume of phosphate buffer 0.2 pH 8.0.

EXAMPLE 7

Diphtheria-tetanus toxoids and pertussis vaccine

Suitable culture media is inoculated with diphtheria and tetanus organisms. After incubation at 35–37° C. for 7 days the organisms have elaborated toxins into the substrate. The elaborating organisms are removed from the sub-strate by filtration. The toxins are converted to toxoids by treatment with formalin at 0.7% for 3–6 weeks and the resultant toxoids are alcohol fractionated. The toxoid fraction is standardized as to potency and alum precipitated.

Suitable culture media is inoculated with H. pertussis organisms. After incubation at 35–37° C. for 48 hours the organisms are harvested from the sub-strate and rendered non-infectious by the addition of ethylene oxide to a final concentration of 1% by weight. The suspension is held at +22° C. for 24 hours. After this time the ethylene oxide is removed by exposing the suspension to reduced pressure (100 to 500 microns of mercury). The product is tested for sterility.

The diphtheria toxoid, tetanus toxoid and pertussis organisms are pooled and diluted in 0.3 M glycine to the desired titer.

Ethylene oxide may then be added to a final concentration of 1% by weight and the polyvalent vaccine held at +22° C. for 24 hours. After this time the ethylene oxide is removed by exposing the suspension to reduced pressure (100 to 500 microns of mercury). The product is tested for sterility, potency, safety and identity.

We claim:

1. A method of preparing immunizing and diagnostic antigens which comprises the steps of subjecting an aqueous suspension containing infectious micro-organisms and antigens, to the action of 0.5% to 5.0% by weight of a 1,2-epoxide of the group consisting of ethylene oxide, propylene oxide, epichlorohydrin, and epibromohydrin at a temperature between about 2° C. and 37° C. for a period of time ranging from not more than about 8 days at the lowest temperature to not more than about 4 hours at the highest temperature, the period of time of exposure of the said antigen and infectious micro-organism to the said 1,2-epoxide being correlated with the temperature and concentration of the 1,2-epoxide so that the minimum length of time of exposure occurs at the highest temperatures and highest concentrations, and the maximum length of exposure occurs at the lowest temperatures and lowest concentrations, being sufficient to render non-infectious the micro-organisms but insufficient to substantially reduce the antigenicity of the antigens present therein and after such period of exposure removing from the aqueous suspension the remaining 1,2-epoxide, and preparing from the suspension a biological product containing diagnostic and immunizing antigens.

2. A method of preparing immunizing and diagnostic antigens which comprises the steps of subjecting an aqueous suspension containing infectious micro-organisms of the group consisting of viruses, rickettsiae and bacteria; and antigens thereof, to the action of 0.5% to 5.0% by weight of ethylene oxide at a temperature between about 2° C. and 37° C. for a period of time ranging from not more than about 8 days at the lowest temperature to not more than about 4 hours at the highest temperature, the period of time of exposure of the said antigen and infectious micro-organisms to the said 1,2-epoxide being correlated with the temperature and concentration of the 1,2-epoxide so that the minimum length of time of exposure occurs at the highest temperatures and highest concentrations, and the maximum length of exposure occurs at the lowest temperatures and lowest concentrations, being sufficient to render non-infectious the micro-organisms but insufficient to substantially reduce the antigenicity of the antigens present therein and after such period of exposure removing from the aqueous suspension and remaining ethylene oxide, and preparing from the suspension a biological product containing diagnostic and immunizing antigens.

3. A method of preparing immunizing and diagnostic antigens which comprises the steps of subjecting an aqueous suspension containing infectious micro-organisms of the group consisting of viruses, rickettsiae and bacteria; and antigens thereof, to the action of 0.5% to 5.0% by weight of propylene oxide at a temperature between about 2° C. and 37° C. for a period of time ranging from not more than about 8 days at the lowest temperature to not more than about 4 hours at the highest temperature, the period of time of exposure of the said antigen and infectious micro-organism to the said 1,2-epoxide being decreased with increased temperature, being sufficient to render non-infectious the micro-organisms but insufficient to substantially reduce the antigenicity of the antigens present therein and after such period of exposure removing from the aqueous suspension the remaining propylene oxide, and preparing from the suspension a biological product containing diagnostic and immunizing antigens.

4. A method of preparing immunizing and diagnostic antigens which comprises the steps of subjecting an aqueous suspension containing infectious micro-organisms of the group consisting of viruses, rickettsiae and bacteria; and antigens thereof, to the action of about 1% by weight of ethylene oxide at a temperature of about 23° C. for one day, the period of time being sufficient to render non-infectious the micro-organisms but insufficient to substantially reduce the antigenicity of the antigens present therein and after such period of exposure removing from the aqueous suspension the remaining ethylene oxide, and preparing from the suspension a biological product containing diagnostic and immunizing antigens.

5. A method of preparing immunizing and diagnostic antigens which comprises the steps of subjecting an aqueous suspension containing infectious micro-organisms of the group consisting of viruses, rickettsiae and bacteria; and antigens thereof, to the action of 0.5% to 5.0% by weight of ethylene oxide at a temperature between about 2° C. and 37° C. for a period of time ranging from not more than about 8 days at the lowest temperature to not more than about 4 hours at the highest temperature, the period of time of exposure of the said antigen and infectious micro-organism to the said 1,2-epoxide being decreased with increased temperature, being sufficient to render non-infectious the micro-organisms but insufficient to substantially reduce the antigenicity of the antigens present therein and after such period of exposure removing from the aqueous suspension the remaining ethylene oxide by subjecting the material to a reduced pressure and preparing from the suspension a biological product containing diagnostic and immunizing antigens.

6. A method of preparing immunizing and diagnostic antigens which comprises the steps of subjecting an aqueous suspension containing infectious micro-organisms and antigens, to the action of 0.5% to 5.0% by weight of ethylene oxide at a temperature between about 2° C. and 37° C. for a period of time ranging from not more than about 8 days at the lowest temperature to not more than about 4 hours at the highest temperature, the period of time of exposure of the said antigen and infectious micro-organism to the said 1,2-epoxide being correlated with the temperature and concentration of the 1,2-epoxide so that the minimum length of time of exposure occurs at the highest temperatures and highest concentrations, and the maximum length of exposure occurs at the lowest temperatures and lowest concentrations, being sufficient to render non-infectious the micro-organisms but insufficient to substantially reduce the antigenicity of the antigens present therein and after such period of exposure removing from the aqueous suspension the remaining ethylene oxide by freezing and drying the aqueous suspension at reduced pressure.

7. A method of preparing influenza vaccine which comprises the steps of subjecting an aqueous suspension containing infectious micro-organisms and influenza antigens to the action of about 1% by weight of ethylene oxide at a temperature of about 23° C. for one day, the period of time being sufficient to render non-infectious the micro-organisms but insufficient to substantially reduce the antigenicity of the antigens present therein and after such period of exposure removing from the aqueous suspension the remaining ethylene oxide and preparing from the suspension an influenza vaccine.

8. A method of preparing equine encephalomyelitis antigen which comprises the steps of subjecting an aqueous suspension containing infectious micro-organisms and equine encephalomyelitis antigens to the action of about 1% by weight of ethylene oxide at a temperature of about 23° C. for one day, the period of time being sufficient to render non-infectious the micro-organisms but insufficient to substantially reduce the antigenicity of the antigens present therein and after such period of exposure removing from the aqueous suspension the remaining ethylene oxide and preparing from the suspension an equine encephalomyelitis antigen.

References Cited in the file of this patent
UNITED STATES PATENTS

| 2,075,845 | Gross et al. | Apr. 6, 1937 |
| 2,125,533 | Winegarden | Aug. 2, 1938 |
| 2,149,304 | Masucci | Mar. 7, 1939 |
| 2,370,768 | Baerwald | Mar. 6, 1945 |

FOREIGN PATENTS

| 238,058 | Switzerland | June 15, 1945 |

OTHER REFERENCES

Fraenkel-Conrat articles in J. Biol. Chem., pp. 227–246, vol. 154, 1944.

Ginsberg et al., Proc. Soc. Exptl. Biol. and Med., vol. 73, No. 4, April 1950, pp. 614–616.

Wilson et al., J. Expt. Med., 1950, vol. 50, pp. 455–458.

"Practical Physiological Chemistry," by Hawk et al., p. 165. Publ. 1947 by the Blakiston Co., Philadelphia, Pa.